United States Patent

Snow

[11] 3,964,131
[45] June 22, 1976

[54] METHOD AND APPARATUS FOR EVISCERATING CLAMS

[75] Inventor: Harold F. Snow, Scarborough, Maine

[73] Assignee: Borden, Inc., Columbus, Ohio

[22] Filed: July 26, 1973

[21] Appl. No.: 382,836

[52] U.S. Cl. .................................. 17/53; 17/45
[51] Int. Cl.² ..................................... A22C 21/00
[58] Field of Search ................ 17/48, 74, 45, 53

[56] References Cited
UNITED STATES PATENTS

| | | | |
|---|---|---|---|
| 2,879,538 | 3/1959 | Peuss | 17/48 X |
| 3,665,556 | 5/1972 | Gruber | 17/48 X |

Primary Examiner—Richard C. Pinkham
Assistant Examiner—William R. Browne
Attorney, Agent, or Firm—George A. Kap; George P. Maskas; Daniel D. Mast

[57] ABSTRACT

The clams are first subjected to a shearing action in the first unit which is a rotating perforated drum having inwardly extending spokes with a rotating rotor disposed within the drum and off-set with respect to the drum axis. The rotor has outwardly extending spokes in intermeshing relationship with the drum spokes. In the first treating unit, the clams are partitioned into uneviscerated tongues, muscles, straps, siphons and occasional spines and then conveyed onto a classifier which separates the tongues from the remaining parts of the clams and discharges the spines to waste. The uneviscerated tongues are then fed into an eviscerator, which is identical in construction to the first unit but is operated at higher relative rotation between the drum and the rotor, where the tongues are flexed and subjected to shearing forces to expel the viscera. The eviscerated tongues and the viscera are introduced into a rotating reel provided with openings of sufficient size to discharge the viscera but to retain the tongues. From the reel, the tongues are conveyed to a point where they are combined with muscles, straps and siphons. The invention also includes the method of subjecting clam meat to a shearing force.

22 Claims, 7 Drawing Figures

METHOD AND APPARATUS FOR EVISCERATING CLAMS

SUMMARY OF THE INVENTION

This invention represents a genuinely unique approach to the solution of evisceration problems in the clam industry. It relates to treatment of clams for removal of viscera by means of a method and apparatus which is characterized by a shearing action of the clam or a portion thereof.

Viscera of a clam generally consists of liver, digestive system and intestinal tract. Although viscera of a clam is edible its removal is desirable because it imparts discoloration to foods prepared therewith and thus detracts from the appearance of such foods.

Attempt to perform the evisceration operation entirely by hand, as was done for a long time, is both expensive and unsatisfactory. Mechanical evisceration has been proposed and utilized but it has heretofore proven to be less than expected because of the continued reliance on manual labor to some degree.

The invention described herein has many advantages over the prior art inventions in this field, such as simplicity in design and the need of fewer persons to operate it. The method and apparatus, which constitute this invention, are utilized to initially sever clams in the first treating unit into their principal components of tongues, muscles, straps and siphons. The tongues are separated from the muscles, the straps and the siphons on a classifier and then conveyed to the second treating unit where the viscera are removed. The eviscerated tongues and the loose viscera are conducted to a perforated reel where the viscera are discharged through the perforations and the tongue is conveyed to a point where it is combined with the muscles, the straps and the siphons and packaged for shipment.

The two treating units are substantially identical in construction but in operation differ in that the clam is subjected to a relatively mild shearing action in the first treating unit whereby the principle parts of the clam are separated, and to a more severe shearing action in the second treating unit where the viscera are extracted from the tongue.

As used herein, the term "clam meats" shall mean whole clams as well as the principal parts of the clam which include tongues, muscles, straps and siphons.

The various features of this invention will become apparent from the detailed description set forth below in connection with the preferred embodiment illustrated in the appended drawings wherein.

Figure 1:
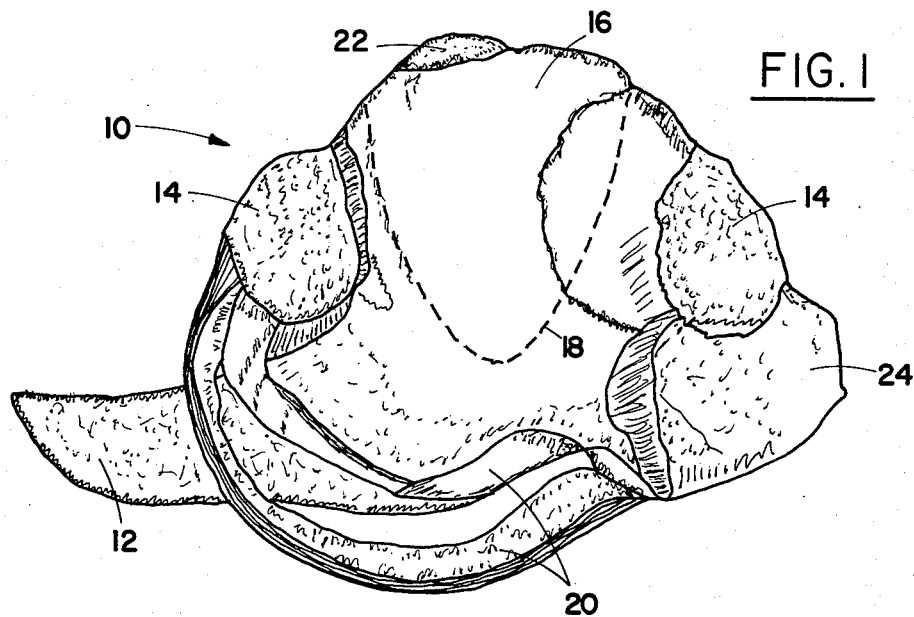
FIG. 1 is a top view of a clam showing the two muscles disposed directly opposite from each other, a siphon disposed directly below one of the muscles, a tongue extending and bridging the two muscles, viscera generally indicated by dotted lines residing within the tongue, and straps secured to one muscle at one end and to the siphon area at the other end.

Referring now to the drawings, FIG. 1 illustrates a clam 10 which has been removed from its shell and is ready for processing. The clam is generally oval in shape and is of a size which ranges from about 3 to 5 inches in length and about 2½ to 4 inches in width with a thickness of about ¾ to 1¼ inches. The clam is composed of a number of distinct parts which are rather weakly joined together by connecting tissue. The largest part which forms about half of the entire clam, is tongue 12. The other parts are two abductor muscles 14 disposed at opposite ends of the abdominal sac 16 which contains viscera 18, two straps 20, root 22 and a siphon 24. Abdominal sac 16 is substantially open at the root 22 and it is in this area that the clam is attached to the shell. Viscera 18 is a dark colored mass which is very soft and easily crushed yet contains a web-like structure of connecting tissue which tends to preserve the original shape during removal except under substantial stress. A spine, no shown, is disposed within the viscera. It is made of a geletenous matter of a light greenish-brown color and has an elongated form on the order of about 1½ inch and about ⅛ of an inch in thickness. Although it is edible, people who are not familiar with the clam structure are horrified to find it in their food because the spine resembles a worm or a grub of some sort. For this obvious reason, it is desirable to remove and discard all spines from clam meat, along with the viscera.

The other parts of the clam are relatively firm and can tolerate far greater stresses without shearing of the tissue. This is especially true of the tongue which is composed of very firm mass which can be subjected to high mechanical shearing stresses in order to expel the viscera. The muscles have an unusual construction in that they are firm in one direction but can be easily dissected and torn apart into generally uniform pieces when a tearing force is applied in the perpendicular direction.

Figure 2:
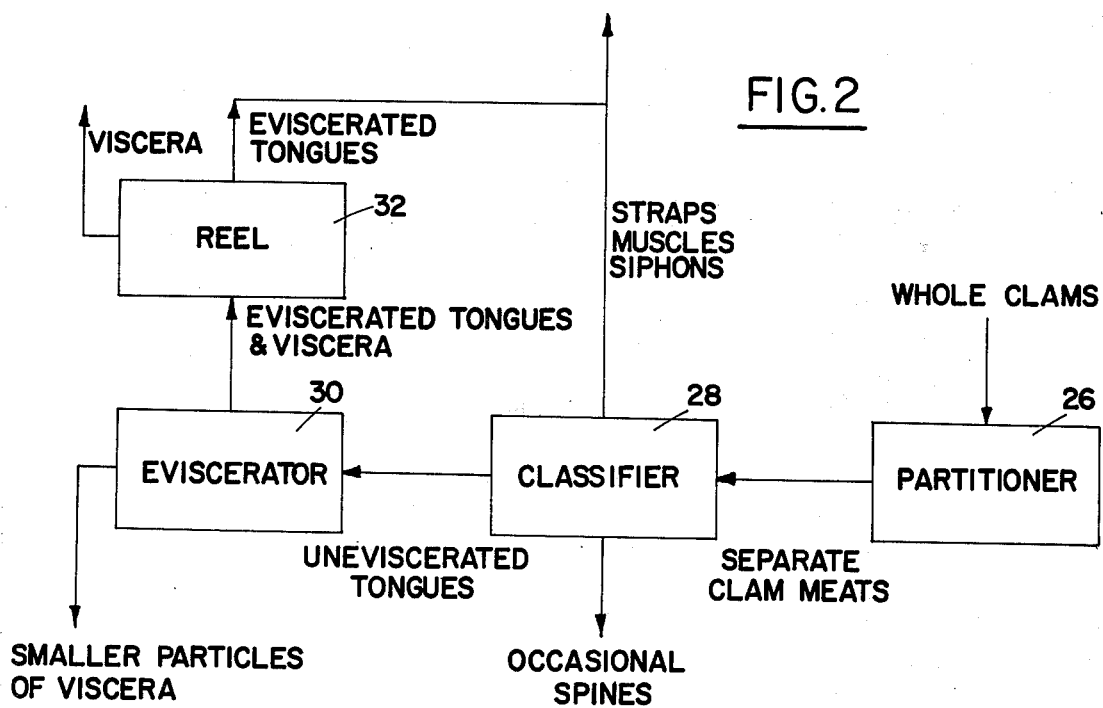
FIG. 2 is a schematic flow diagram illustrating the principal components of the plant and the method steps involved in treating clams.

Whole clams, which have been removed from shells and washed, are conveyed to a generally horizontally disposed first treating unit or partitioner 26, shown in the block diagram of FIG. 2, which is partly submerged in water. In this unit, shearing action is imparted to the whole clams to sever the connecting tissue so that the clams are separated into tongues, abduction muscles, straps, siphons and occasional spines. Usually, the spines will remain intact in the viscera until a later time when the tongues are subjected to vigorous shearing force to expel the viscera as well as the spines. The forces acting on clams in the partitioner cause perhaps 10% of the spines to extrude themselves out of the visceral mass and thus become free whereas the other 90% of the spines remain intact in the viscera and are eventually removed in the eviscerator. Partition of a clam into its principal parts is accomplished by a force applied at random points on the clam by multiple impacts. The straps become snagged on the spokes and are thus torn from the clam.

Figure 3:
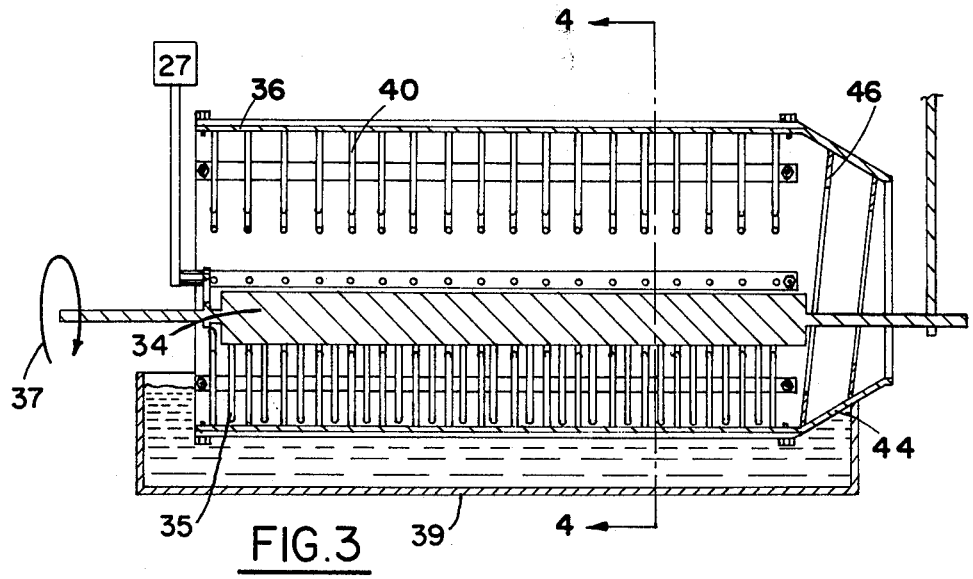
FIG. 3 is a view of a treating unit taken through the vertical plane 3—3 of FIG. 4 which includes a perforated drum with spokes extending inwardly and a rotor disposed within the drum off-set from its axis and also provided with spokes which come close to the ddrum at one point as they rotate relatively and in drum direction to the rotation of the drum.
Figure 4:
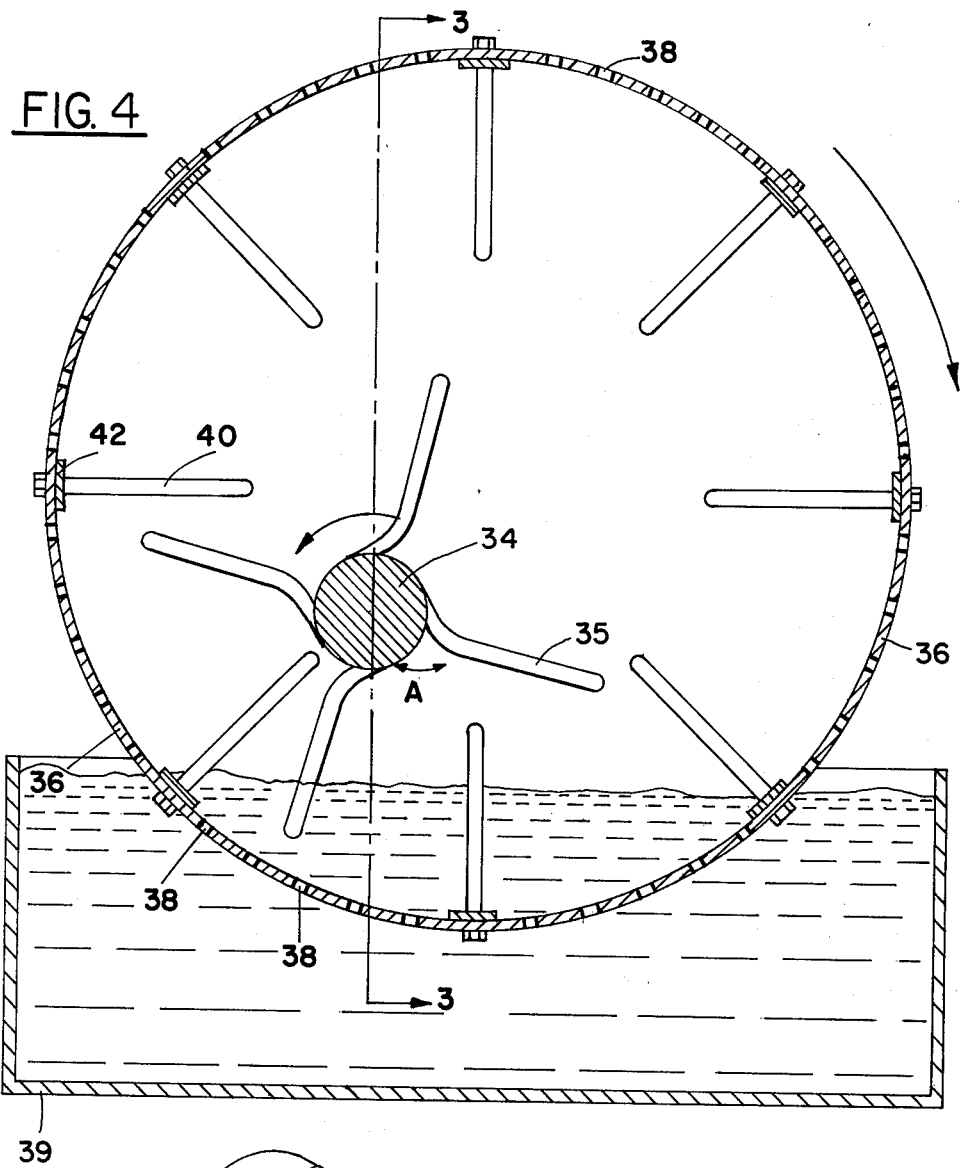
FIG. 4 is a view taken along plane 4—4 of FIG. 3 and shows the treating unit with the disposition of the rotor to the drum.
Figure 7:
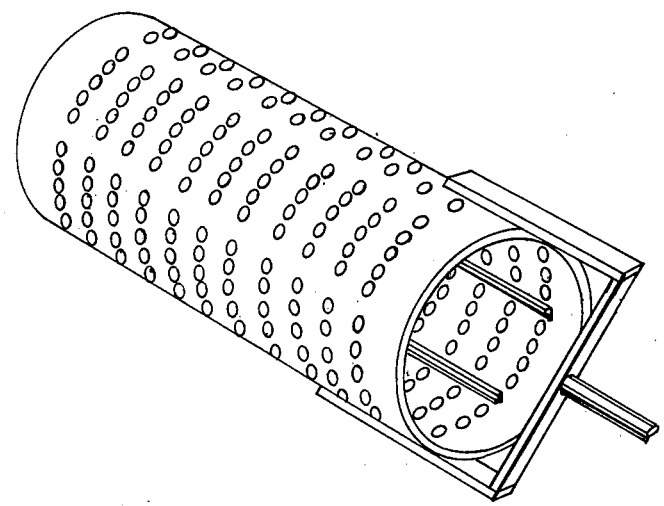
FIG. 7 is a perspective view of the reel which receives eviscerated tongues and viscera and discards the viscera through the perforations.

Partitioner 26 is suspended from a pair of spaced pulleys which are affixed to an overhead shaft by means of a pair of belts entrained about a pulley and the partitioner at each end thereof. As the shaft is rotated, the pulleys transmit this motion to partitioner 26 through the belts. The eviscerator is suspended in the same fashion. Drive means for the partitioner and the eviscerator is generally illustrated by reference numeral 27 in FIG. 3.

The clam parts are discharged from the first treating unit 26 onto classifier 28 which is mounted eccentrically on a shaft to obtain a fast rotary motion whereby the clam parts are thrown forward a small increment at a time. Classifier 28 includes an upper and a lower plate, as will be more fully described. The upper plate has large enough openings to allow the straps, muscles, siphons and occasional spines to pass through but the openings are such as to retain the tongues with the viscera intact on the upper plate. The lower plate has a series of elongated slots for discharging the spines to waste. The clam parts, which include the muscles, straps and siphons, from the lower plate of classifier 28 are conveyed to be washed and inspected whereas the tongues are taken to the second treating unit or eviscerator 30 which is partly submerged in a tank of water and is disposed at about 10° — inclination from inlet to outlet.

The action in eviscerator 30 is much more vigorous than in the first treating unit in order to separate the viscera from the tongue. Since the tissue is weak at the root 16 of the clam and the visceral sac is in fact partly open, the viscera is eventually forced out from the tongues in this area along with the spines. The spines, together with the smaller pieces of viscera, are discharged through openings in the drum of eviscerator 30 whereas the tongues and larger pieces of viscera are fed into reel 32 where the viscera is disposed of through the openings in reel 32 and the tongues are conveyed through to a washing station prior to being recombined with the other parts of the clam.

The first treating unit 26 is essentially identical to the second treating unit or eviscerator 30. As shwon in FIG. 3, it generally includes rotor 34 and a drum or cylinder 36 which may be about 2 feet in diameter and about 5 feet in length. In either case, the drum is immersed in a tank 39 containing water to a depth of perhaps one-fifth of its diameter. A multiplicity of openings 38 about 7/16 of an inch in diameter are provided in the drum for allowing small particles of clams and other matter to be discharged. Spokes 40 project radially from the drum inwardly towards its axis and are welded or can be fixed in any manner to bar 42 which spans from one end of the drum to the other. Bar 42 is secured to the drum in any suitable fashion. There are 8 rows of spokes 40 on the drum with 18 spokes in each row spaced from 2½ to 3 inches apart. Spokes 40 are 6 inches long and ⅜ of an inch thick.

The outlet end of the drum includes a conical section 44 which is about a foot long with a helical flight bar 46 disposed on its interior surface for elevating the clam meats out of the lower areas of the drum for discharge. Openings in the drum at the inlet and the outlet are about 16 inches in diameter.

Rotor 34 is a hollow tube shaft 6 inches in diameter and about 4½ feet long to which are affixed 4 rows of equally spaced spokes 35 of similar size to the spokes on the drum. The rotor is rotated counterclockwise with respect to the drum by a drive means generally indicated by arrow 37 in FIG. 3. There are 17 spokes in each row. Spokes 35 are welded to rotor 34 in such a way that the trailing angle A between the spokes and the rotor is acute. At a point about 1 inch from where the spokes are welded to the rotor, the spokes have a bend into the direction of rotor rotation. The bend in the spokes has an included angle of about 150°. As the rotor spokes turn in counterclockwise direction, clam straps stapled over the spokes at points where they are welded to the rotor, would tend to be moved outward toward the end of the spokes because of the acute angle that the initial portion of the spokes make with the rotor. After the straps have moved more than 1 inch from the welding point of the spokes, they would then be picked up by the drum spokes which come to within 1 inch of the rotor at the 7 o'clock disposition, and thus build-up and fouling is prevented.

The spokes on the rotor are spaced about 2½ to 3 inches apart in a manner so that the spokes on the drum pass about medially between and intermesh with the spokes on the rotor. The eccentrically mounted rotor is off-set about 3 inches down and about 3 inches to to left of the drum axis. With this disposition, the spokes on the drum and the rotor interact at about 7 o'clock position at which point, the rotating spokes come within about 1 inch of the drum, as was already noted. Rotation of the rotor is at about 60 RPM and that of the drum is at about 80 RPM when the treating unit is used as a partitioner. When the treating unit is used as eviscerator, rotation of the rotor is at about 180 RPM and that of the drum is again at about 80 RPM.

Since the perforated drum is partially submerged in water, there is a reservoir of water at bottom of the drum which extends to and somewhat beyond the 7 o'clock position. This means that during treatment stage, the clam meats are tossed around in the water reservoir as they are being worked upon by the spokes on the drum intermeshing with the spokes on the rotor. It should be remembered that the clearance between the spokes on the drum and rotor is 2½ to 3 inches. When these spokes intermesh, the clearance is reduced to ½ or about 1½ inches. It is this clearance that the clam meats have to pass over and over again as the drum and the rotor rotate. Since the clam meats are not perfectly aligned as to present the narrowest or slimmest dimension when the spokes contact the clam meats, it is easy to see that the clam meats will be subjected to various flexing, tearing and shearing forces as they are being traversed by the intermeshing spokes.

The whole clams introduced into the first treating unit are subjected to a shearing action by virtue of the drum spokes and rotor spokes passing by each other as the clams are caught between. Being long and narrow in shape, the straps have a tendency to be snagged by the spokes which causes the desired tearing action to remove the strap portions from the tongues. The muscles are likewise removed in this treatment of the clams since the tissue bond of the muscle to the tongue is very weak. Rotation of the rotor and the drum are set as to permit and desired tearing effect without damaging the fragile muscles or beating the viscera from the visceral cavity.

Figure 5:
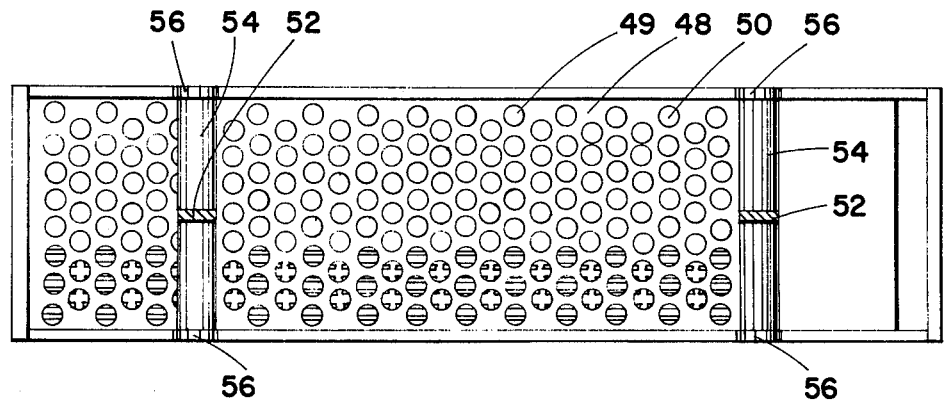
FIG. 5 is a top view of the classifier showing round openings in the upper plate of a size sufficient to retain the tongues on the upper plate and to discharge the straps, muscles, siphons and spines onto the lower plate which is provided with elongated slots of a size for passing the spines through to a waste hopper and to retain the straps, muscles and siphons thereon.
Figure 6:
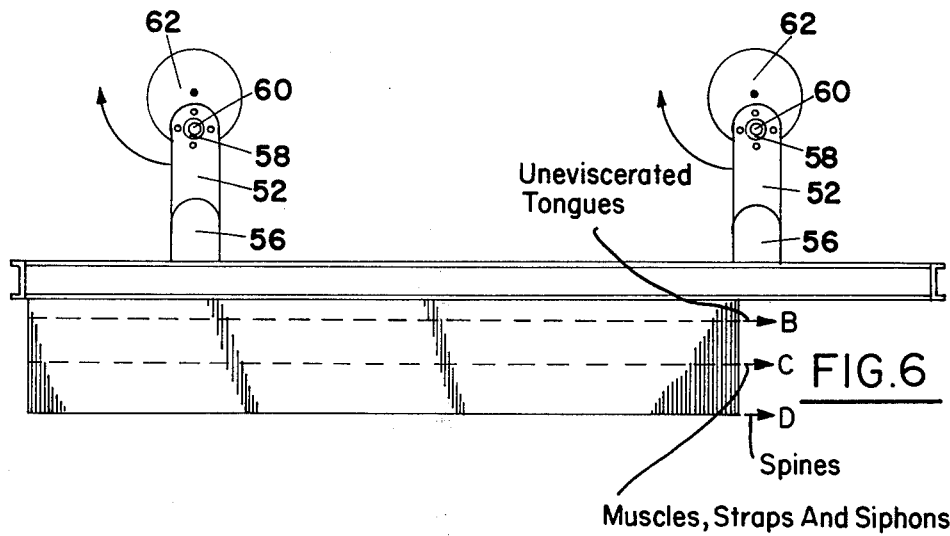
FIG. 6 is a side view of the classifier showing a generally rectangular box-like construction.

The clams emerge from the first treating unit separated into their principal parts and are discharged onto the classifier 28, top view of which is shown in FIG. 5. Classifier 28 is in the form of a trough about 3 feet long and about 1 foot wide with a pair of vertically spaced plates 48, 50. The upper plate 48 has a multiplicity of round openings 49 which are 1½ inches in diameter. The lower plate 50, which is disposed about one half of a foot below the upper plate 48, has a series of spaced rows of elongated slots 51 which are 1½ inches in length and ⅛ of an inch wide. Classifier 28 includes a pair of suspending bars 52 secured medially to crossbraces 54 between the sides of the classifier. The crossbraces 54 are affixed between a pair of opposing flanges 56 which are welded to the sides of the classifier at both ends thereof. Each suspending bar 52 carries a bearing 58 which is rotatably mounted on a pin 60 extending from disc 62. Disc 62 is rotated at about 50 RPM by any suitable means, such as electric motor. As is evident from FIG. 6, pin 60 is off-set from the center of disc 62. This off-set can vary but is preferably from about 2 to 3 inches.

The classifier may be conveniently inclined from inlet to outlet at about 30°, depending on the size of the openings in the top plate and the length of the plate. The clam parts which are dropped on the classifier are propelled down the incline as the shaft system having the ball-crank arrangement rotates in a clockwise direction, as shown by arrows in FIG. 6. The tongues, being the largest portion of the clam, pass along the upper plate having holes of insufficient size to permit the tongues to drop through but large enough for the siphons, straps, muscles and spines to be discharged onto the lower plate. Uneviscerated tongues are discharged onto a conveyer which carries them to eviscerator 30. The other product line, which is now on the lower plate, is tossed forwardly and downwardly on the classifier to allow the spines to drop through the slots. Thus, the uneviscerated tongues leave the classifier in one stream, denoted by letter B in FIG. 6, which is directed to the eviscerator 30 with a second product stream, denoted by letter C, directed to a washing station and inspection. The second product stream is composed of muscles, straps and siphons. Spines leave the classifier as a third product stream denoted by letter D.

Uneviscerated tongues are continuously charged into the second treating unit or eviscerator 30 which is essentially identical in construction to the first unit. Operationally, whereas the speed of the rotor in the first unit is about 60 RPM, the speed of the rotor in the eviscerator is about 180 RPM. The eviscerator is inclined at about 10° from inlet to outlet and is submerged partially in a tank of water to about 1/5 of its diameter. With the use of appropriate rotational speed of the drum and the rotor, the tongues are processed in the eviscerator to completely expel the visceral material upon emerging from the unit. The eviscerator is also perforated with holes roughly 7/16 of an inch in diameter to allow the smaller pieces of the viscera to find its way out through the holes.

The eviscerated tongues and the larger visceral pieces are conducted through a downwardly inclined, rotating perforated reel. The reel is rotated at 50 RPM and is inclined at about 10° downwardly from inlet to outlet. The openings in the reel are 1½ inches in diameter and are of sufficient size to permit all of the viscera to pass out through the holes but of insufficient size to permit tongues to do likewise. The reel can be flighted with ¾ inch bars to move the tongues and viscera progressively in a helical path through the reel whereupon viscera drop through the openings in the reel. The tongues are further washed and then conveyed to be re-combined with the other washed and inspected pieces of the clams.

Although the preferred embodiment of the present invention has been illustrated and described, it will be evident to those skilled in the art that various modifications may be incorporated without departing from the principles set forth herein.

What is claimed is:

1. Method of treating clam meats comprising the steps of subjecting clam meats to a sufficient force applied at random points by multiple impacts to sever the connecting tissue between the various parts of a clam in order to partition the clam into its component parts of uneviscerated tongue, muscles, straps, siphons and occasional spines; separating the uneviscerated tongues from the remainder of clam parts to form a first product stream composed of uneviscerated tongues and a second product stream composed of remaining parts of a clam; removing viscera from the tongues by subjecting uneviscerated tongues to a sufficient shearing force applied at random points by multiple impacts to expel the viscera from the tongues;

2. Method of claim 1 including the step of separating clam spines from the second product stream by passing the second product stream over a second support surface provided with elongated slots large enough to discharge the spines but small enough to retain the remainder of the second product stream.

3. Method of claim 2 including the step of separating the uneviscerated tongues from muscles, straps, siphons and spines by passing the clam parts over a first support surface provided with openings small enough to retain the tongues but large enough to discharge the remainder of clam parts.

4. Method of claim 3 including the steps of partially submerging clams in water and clam juices while partitioning the clams and partially submerging clam tongues in water and clam juices while eviscerating same.

5. Method of claim 4 including the steps of conveying eviscerated tongues and viscera onto a perforated support surface provided with openings large enough to discharge viscera and retain the tongues, and moving the support surface to effect separation of viscera from the tongues.

6. Method of claim 4 where separation of tongues and spines from the remainder of clam parts is accomplished by moving the first and second support surfaces in short and quick circular path so that the clam parts disposed on the support surfaces are tossed forward until the desired separation is accomplished.

7. Method of claim 6 wherein partition and evisceration steps are carried out in rotating perforated cylinders, the method further including the step of inclining the cylinders to effect a uniform conveyence of their contents from inlet to outlet.

8. Method of claim 7 wherein said first and second support surfaces are moved in a vertically circular path at about 50 RPM about a fixed circular path about 6 inches in diameter.

9. Apparatus for treating clam meats comprising a cylindrical member having a lower region and said cylindrical member disposed substantially horizontally having an inlet and an outlet into which the clam meats are introduced through the inlet of said member;

plurality of elongated means extending inwardly from said cylindrical member for engaging the clam meats in the lower region of said cylindrical member;

an elongated member extending through said cylindrical member substantially parallel to its longitudinal axis but spaced from the longitudinal axis of said cylindrical member;

plurality of elongated means extending outwardly from said elongated member in intermeshing relationship with said elongated means on said cylindrical member for engaging the clam meats in the lower region of said cylindrical member; and means for imparting rotation through 360° to said elongated means on said cylindrical member and means for imparting rotation through 360° to said elongated means on said elongated member to apply shearing forces to the clam meats.

10. Apparatus of claim 9 including means for maintaining water in said cylindrical member at a level to submerge clams at the lower region thereof.

11. Apparatus of claim 9 including a tank containing water and clam juices within which said cylindrical member is partially submerged, said cylindrical member containing openings which allow the water and clam juices to enter said cylindrical member.

12. Apparatus of claim 11 wherein said openings are large enough to allow small pieces of viscera, spines and other small pieces of a clam to be discharged into said tank but small enough to prevent discharge of clam meats.

13. Apparatus of claim 12 wherein said cylindrical member and said elongated member are about four feet long and are disposed at a slight inclination to a horizontal plane; a conical section about one foot long attached at the outlet end of siad cylindrical member; a flight screw provided in said conical section for moving clam meats out of said cylindrical member; said elongated means being spokes about 6 inches long and about ⅜ of an inch thick; said elongated member is a rotor about 6 inches in diameter which is eccentrically mounted within said cylindrical member at a position by about 3 inches down and three inches to the left of the axis of said cylindrical member; means for rotating said cylindrical member in a clockwise direction; and means for rotating said rotor in a counterclockwise direction.

14. Apparatus of claim 13 which includes 8 equally spaced rows of spokes on said cylindrical member, the spokes being spaced from 2-½ to 3 inches from each other; and 4 equally spaced rows of spokes on said rotor, said spokes being spaced from 2-½ to 3 inches from each other and are bent at a point about 1 inch from where they are affixed to said rotor.

15. Apparatus of claim 14 wherein said cylindrical member is immersed in said tank of water and clam juices to a depth of about 1/5 of its diameter and said spokes are affixed to said rotor at an acute trailing angle.

16. Apparatus of claim 13 including a classifier having an upper plate on which are disposed clam meats issuing from said cylindircal member, said upper plate containing openings small enough to retain clam tongues but large enough to allow discharge of the remaining clam meats, means for moving in a circular path said classifier around its transverse axis to toss clam meats in a forward direction and thus effect separation of clam tongues from the remaining clam meats by discharge of the remaining clam meats through the openings.

17. Apparatus of claim 16 including an eviscerator with an inlet and an outlet partially submerged in a tank filled with water and clam juices which is identical in construction to said cylindrical member as defined in claim 1, said eviscerator is disposed at small inclination from inlet to outlet and receives uneviscerated tongues from said classifier at the inlet and discharges eviscerated tongues at the outlet.

18. Apparatus of claim 17 wherein said classifier includes a lower plate spaced below said upper plate which contains elongated slots large enough to discharge clam spines but small enough to retain muscles, straps and siphons when said classifier is moved in a circular path.

19. Apparatus of claim 18 including a pair of spaced disks disposed above said classifier, a shaft extending from each of said disks at a distance of from 2 to 3 inches from the central axis of each disk, means for connecting the classifier to the disks, means for rotatably connecting said classifier connecting means to said classifier to said shafts, and means for rotating at least one of said disks around its central axis.

20. Apparatus of claim 19 wherein said disks are rotated at about 80 RPM, said elongated member positioned in said cylindrical member is rotated at 60 RPM.

21. Apparatus of claim 20 including a reel having an inlet and an outlet of said eviscerator into which are fed eviscerated clam tongues and viscera from said eviscerator and means for rotating said reel, said reel containing openings large enough to discharge viscera but small enough to retain clam tongues.

22. Apparatus of clam 21 wherein said reel is inclined towards the discharge end for conveying eviscerated tongues out of the reel.

\* \* \* \* \*